tion is detected and a positional timing signal showing a time
United States Patent Yoshida et al.

[11] Patent Number: 6,137,756
[45] Date of Patent: Oct. 24, 2000

[54] INFORMATION RECORDING USING TECHNIQUE FOR DETECTING ERRONEOUS RECORDING

[75] Inventors: Masayoshi Yoshida; Yoshitaka Shimoda; Yuji Tawaragi, all of Tokorozawa, Japan

[73] Assignee: Pioneer Electronic Corporation, Tokyo-to, Japan

[21] Appl. No.: 09/159,859

[22] Filed: Sep. 24, 1998

[30] Foreign Application Priority Data

Sep. 25, 1997 [JP] Japan ................................. 9-260664

[51] Int. Cl.[7] .............................. G11B 5/09; G11B 27/36
[52] U.S. Cl. ................................. 369/47; 369/48; 360/31
[58] Field of Search .................................. 369/47, 48, 54, 369/58, 59, 32, 33, 124.01, 124.07; 360/25, 31, 49, 51

[56] References Cited

U.S. PATENT DOCUMENTS

5,446,604  8/1995  Chiba ........................................ 360/49
5,557,594  9/1996  Chiba et al. ............................... 369/59

*Primary Examiner*—Paul W. Huber
*Attorney, Agent, or Firm*—Ladas & Parry

[57] ABSTRACT

Provided are a method and apparatus for detecting an occurrence of erroneous recording in recording information to be recorded into a DVD-R. The information consists of a plurality of ECC blocks each including a predetermined number of recording sectors. In the DVD-R, synchronizing information, accomplished by wobbling of groove tracks, and positional information, such as pre-pits, are previously recorded. Both the synchronizing information and the positional information are detected, then a synchronizing timing signal showing a time at which the synchronizing information is detected and a positional timing signal showing a time at which each ECC block is assigned to be recorded are produced. The synchronizing timing signal produced during an interval defined by the successive two positional timing signals is counted in number, and a state signal for estimating the occurrence of the erroneous recording is produced on comparison between the counted number and the predetermined number of the recording sectors. The method and apparatus are suitable for information recording method and apparatus.

12 Claims, 10 Drawing Sheets

INFORMATION RECORDING USING TECHNIQUE FOR DETECTING ERRONEOUS RECORDING

BACKGROUND OF THE INVENTION

The present invention relates to recording objective information into such recording media as optical disks, and, in particular, to the recording capable of detecting erroneous recording of information (that is, recording of different information from objective information) prior to the actual recording.

In general, for recording objective information (i.e., information to be recorded) into recording media, such as optical disks, a recording clock signal synchronous with travel speeds of recording media is used so that recording pits are formed which accurately correspond in sizes to the content of the information to be recorded.

When the recording is carried out with a CD-R (Compact Disk-Recordable), which had been a general type of recordable optical disk, a recording clock signal whose frequency is set to a reference frequency for controlling the rotation of the CD-R is output from a clock signal generator constructed by having a crystal oscillator and used for the recording.

To the contrary, a DVD-R (DVD-Recordable) has been intensively developed which has a packing density approximately seven times larger than the CD-R. Owing to the raised packing density, the DVD-R needs to increase accuracy in recording positions thereon compared to the CD-R.

In such case that the recording clock signal thus-generated is used in recording for the DVD-R, the DVD-R may have some disturbance that causes its disordered rotation. In such state, the DVD-R rotation speed and the recording clock signal frequency is out of synchronization, resulting in an inaccurate recording operation.

Thus, a countermeasure against the problem is taken such that a synchronizing signal pre-recorded in the DVD-R which has not undergone any information recording yet is detected to yield a recording clock signal based on the synchronizing signal, and even when the DVD-R rotation deviates from the steady speed due to any disturbance, the recording clock signal frequency is also made to shift depending on the deviations in the DVD-R rotation speed. In consequence, the frequency of the recording clock signal always synchronizes with the rotation speed of the DVD-R.

However, in this type of information recording apparatus, there is the possibility that the synchronizing signal cannot be detected accurately, owing to, for example, defects formed on the DVD-R, such as scratches or fingerprints. If such case happens, the processing for yielding the recording clock signal is influenced, thereby leading to inaccurate recording of information to be recorded.

Accordingly, it is an object of the present invention to provide a technique for detecting erroneous recording of information, which detects an synchronous state between the rotation speed of an optical disk and the frequency of a recording clock signal, the state being brought about in occasions which the synchronizing signal cannot be detected accurately from the optical disks, and senses a possibility of causing erroneous recording in advance, thus being able to take appropriate measures for it. The detecting technique is practiced into a method and apparatus for detecting erroneous recording and a method and apparatus for recording information which employ the technique for detecting erroneous recording.

SUMMARY OF THE INVENTION

According to one aspect of the present invention, there is provided a method of detecting an occurrence of erroneous recording in recording information to be recorded into a recording medium, wherein the information to be recorded consists of a plurality of information blocks each including a predetermined number of information units each including a predetermined amount of partial information to be recorded; synchronizing information is previously recorded in the recording medium every region into which the partial information is recorded; and positional information is previously recorded in the recording medium every region into which the information to be recorded constituting each information block is recorded, the method comprising the steps of; detecting both the synchronizing information and the positional information from the recording medium; first producing, using the detected synchronizing information, a synchronizing timing signal showing a time at which the synchronizing information is detected; second producing, using the detected positional information, a positional timing signal showing a time at which each information block is assigned to be recorded; counting the synchronizing timing signal in number produced during an interval defined by the successive two positional timing signals; and third producing a state signal for estimating the occurrence of the erroneous recording on the basis of the counted number of the synchronizing timing signal and the predetermined number of the information unit.

In the above configuration, obtained is the number of the synchronizing timing signal counted during an interval defined by the two successive positional timing signals which correspond to one region into which one information block is assigned to be recorded. Since a possibility of erroneous recording is estimated according to the obtained number, the estimation becomes accurate.

Therefore, using the state signal enables a more reliable detection of erroneous recording, excluding failures in the detection, thus making it possible to accurately perform information recording.

Preferably, the recording medium is a DVD-R, the information block is an ECC block of the DVD-R, and the information unit is a recording sector of the ECC block. A possibility of erroneous recording can be estimated every ECC block.

Still preferably, the state signal is a signal for estimating whether or not there is a possibility of the erroneous recording, and the state signal produced in the third producing step shows there is a possibility of the erroneous recording in the region into which the one information block is recorded, provided the number of the counted synchronizing timing signal and the predetermined number differs from each other.

As a result, a simple comparison between the number of the synchronizing timing signal and the predetermined number as a reference leads to estimation for a possibility of erroneous recording. Thus, processing for detecting erroneous recording can be simplified.

Another aspect of the present invention is a method of recording information to be recorded in a recording medium, wherein the information to be recorded consists of a plurality of information blocks each including a predetermined number of information units each including a predetermined amount of partial information to be recorded; synchronizing information is previously recorded in the recording medium every region into which the partial information is recorded; and positional information is previously recorded in the recording medium every region into which the information to be recorded constituting each information block is recorded, the method comprising the steps of; detecting both the synchronizing information and the positional information from the recording medium; first producing, using the detected synchronizing information, a synchronizing timing signal showing a time at which the synchronizing information is detected; second producing, using the detected positional information, a positional timing signal showing a time at which each information block is assigned to be recorded; counting the synchronizing timing signal in number produced during an interval defined by the successive two positional timing signals; third producing a state signal for estimating an occurrence of erroneous recording on the basis of the counted number of the synchronizing timing signal and the predetermined number of the information unit; and recording the information to be recorded into the recording medium with correction of the information to be recorded on the basis of the state signal.

According to another aspect of the invention, there is provided an apparatus for detecting an occurrence of erroneous recording in recording information to be recorded into a recording medium (such as DVD-R), wherein the information to be recorded consists of a plurality of information blocks (such as ECC blocks) each including a predetermined number of information units (such as recording sectors) each including a predetermined amount of partial information to be recorded; synchronizing information is previously recorded in the recording medium every region into which the partial information is recorded; and positional information is previously recorded in the recording medium every region into which the information to be recorded constituting each information block is recorded, the apparatus comprising; means for detecting both the synchronizing information and the positional information from the recording medium; a first element for producing, using the detected synchronizing information, a synchronizing timing signal showing a time at which the synchronizing information is detected; a second element for producing, using the detected positional information, a positional timing signal showing a time at which each information block is assigned to be recorded; an element for counting the synchronizing timing signal in number produced during an interval defined by the successive two positional timing signals; and a third element for producing a state signal for estimating the occurrence of the erroneous recording on the basis of the counted number of the synchronizing timing signal and the predetermined number of the information unit.

It is preferred that the recording medium is a DVD-R, the information block is an ECC block of the DVD-R, and the information unit is a recording sector of the ECC block.

It is also preferred that the state signal is a signal for estimating whether or not there is a possibility of the erroneous recording, and the state signal produced by the third producing element shows there is a possibility of the erroneous recording in the region into which the one information block is recorded, provided the number of the counted synchronizing timing signal and the predetermined number differs from each other.

Still, as another aspect of the present invention, provided is an apparatus for recording information to be recorded in a recording medium (such as DVD-R), wherein the information to be recorded consists of a plurality of information blocks (such as ECC blocks) each including a predetermined number of information units (such as recording sectors) each including a predetermined amount of partial information to be recorded; synchronizing information is previously recorded in the recording medium every region into which the partial information is recorded; and positional information is previously recorded in the recording medium every region into which the information to be recorded constituting each information block is recorded, the apparatus comprising; an element for detecting both the synchronizing information and the positional information from the recording medium; a first element for producing, using the detected synchronizing information, a synchronizing timing signal showing a time at which the synchronizing information is detected; a second element for producing, using the detected positional information, a positional timing signal showing a time at which each information block is assigned to be recorded; an element for counting the synchronizing timing signal in number produced during an interval defined by the successive two positional timing signals; a third element for producing a state signal for estimating an occurrence of erroneous recording on the basis of the counted number of the synchronizing timing signal and the predetermined number of the information unit; and an element for recording the information to be recorded into the recording medium with correction of the information to be recorded on the basis of the state signal.

In the case of the erroneous recording detecting apparatus and the information recording apparatus, the same or equivalent advantages as or to ones in the forgoing methods can be obtained.

DESCRIPTION OF THE PREFERRED EMBODIMENTS

Referring to the accompanying drawings, preferred embodiments of the present invention will be described. In the following embodiments, described is an information recording apparatus used for recording with a DVD-R, employed as a recording medium, in which not only address information expressing desired positions on a disk to be recorded with objective pieces of information is recorded by forming pre-pits thereon as pre-information but also a synchronizing signal is recorded thereon for controlling the rotation speed of the disk in its recording.

(I) First embodiment

A first embodiment of the present invention will be described with reference to FIGS. 1 and 2. The first embodiment concerns a DVD-R, adopted as a recording medium, where the synchronizing signal is recorded thereon by wobbling a groove track later-described at a specified frequency and pre-pits which correspond to the foregoing pre-information are formed thereon.

Figure 1:
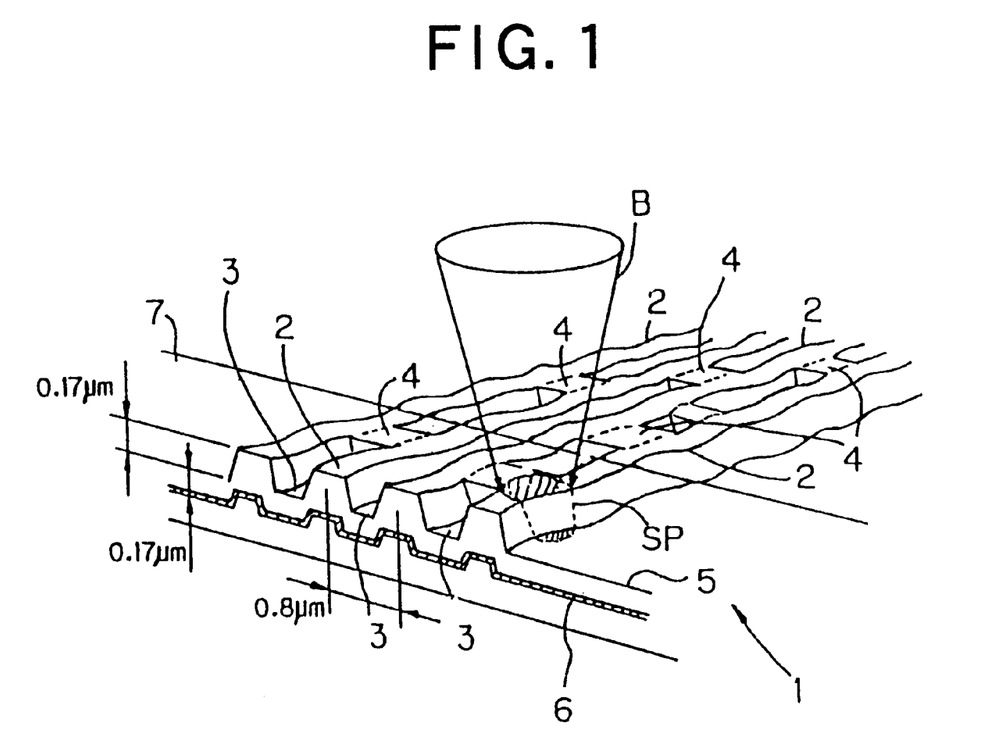
FIG. 1 is a perspective view of one example of a DVD-R according to a first embodiment of the present invention.

Using FIG. 1, the structure of the DVD-R will be first explained.

In FIG. 1, there is shown a DVD-R 1 having a pigment layer 5 and being formed into a pigment type DVD-R into which information is writable only one time. The DVD-R 1 is provided with groove tracks 2 into which information to be recorded is written and land tracks 3 which guide a light beam, such as a laser beam, to the groove tracks 2, the light beam being used as reproducing or recording light. Also the DVD-R 1 has a protective layer 7 protecting those tracks and a gold-deposited layer 6 reflecting a light beam B in reproducing information which has been recorded. Pre-pits 4 which correspond to preinformation are formed in the land tracks 3. The pre-pits 4 are formed before the delivery of the DVD-R 1.

The groove tracks 2 are made to wobble at a frequency in agreement with the rotation speed of this DVD-R 1. Like the pre-pits 4, a synchronizing signal for rotation control based on wobbling of the groove tracks 2 is recorded prior to the delivery of the DVD-R 1. In the DVD-R 1, "information to be recorded" is handled, which is such information as image information other than the pre-information and synchronizing signal and which is planned to be recorded. For recording information to be recorded, with an information recording apparatus later described, operation is carried out such that a synchronizing signal is acquired by detecting a wobbling frequency of the groove track 2 so that the rotation of the DVD-R 1 is controlled at a given rotational speed, pre-information is acquired previously by detecting the pre-pit 4 and on the basis of the detected pre-information, an output of the light beam B employed as a recording light beam is set to an optimum value in addition to other parameters set, and address information which represents positions on the DVD-R 1 is acquired together with other necessary information so that information to be recorded is recorded on corresponding positions to the address information.

When recording of information to be recorded is performed, the light beam B is radiated in a manner that its center agrees with the center of each groove track 2, so that recording information pits which correspond to information to be recorded are formed on the groove track 2. The recording information pits represent recorded information. The size of the light spot SP is determined so that it radiates on part of the land track 3 as well as the groove track 2. Using partial reflected light of the light spot SP radiated on the land track 3, the pre-information is detected from the pre-pits 4 with a push-pull method (i.e., a radial push-pull method adopting a light detector in which detecting elements are divided by dividing lines parallel to a rotation direction of the DVD-R 1), thus the pre-information being acquired, while using the reflected light of the light spot SP radiated on the groove track 2, a wobbling signal is detected from the groove track 2, thus a clock signal for rotation control being acquired.

Figure 2:
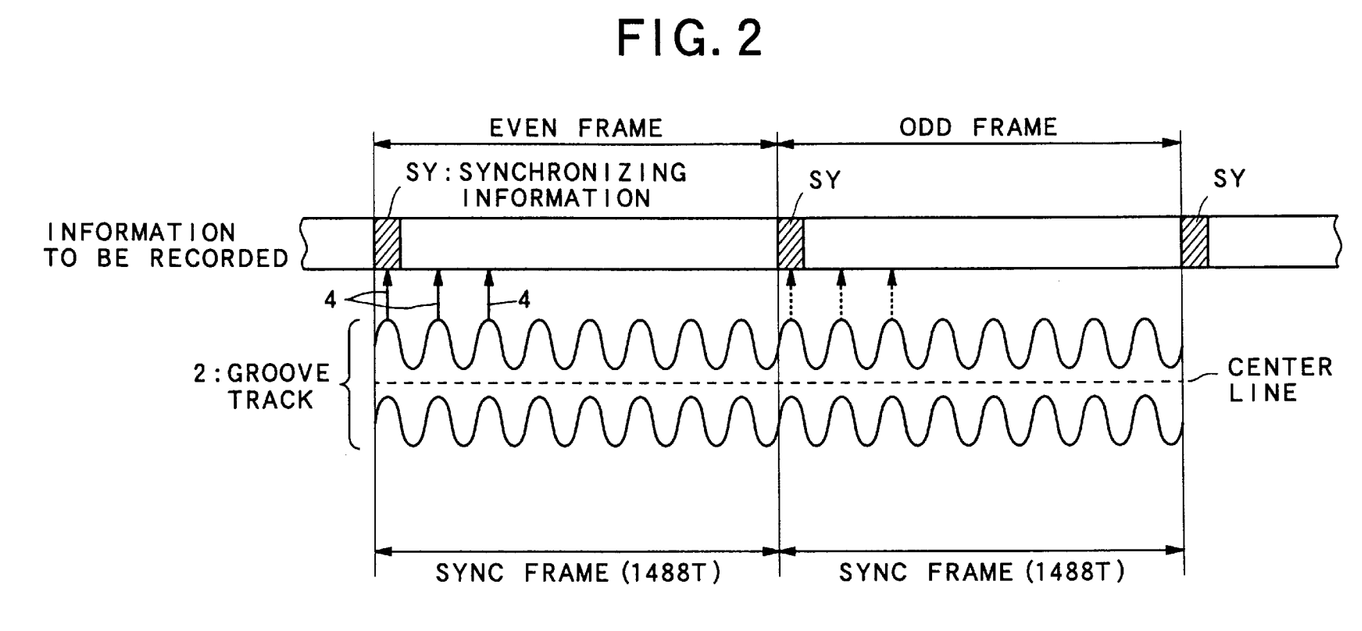
FIG. 2 shows a recording format of the DVD-R.

Referring to FIG. 2, recording formats of pre-information and rotational control information both previously recorded in the DVD-R 1 according to the embodiment will be described. In FIG. 2, the upper stage shows a recording format for information to be recorded, while the lower one, which is depicted in wave forms, shows a wobbling state (plan view) of the groove track 2 into which information to be recorded will be written. Upward arrows placed between the upper and lower stages in the figure pictorially illustrate positions at which pre-pits 4 are formed. For the sake of easy understanding, the wobbling state are exaggerated in terms of its amplitude. The information to be recorded is written at positions on the center line of the groove track 2.

As shown in FIG. 2, the information to be recorded is divided every sync frame beforehand. Twenty-six (26) sync frames compose one recording sector, which is handled as the information unit. Sixteen (16) recording sectors form one ECC block, which is handled as the information block. Compared with a unit length (hereinafter referred to as "T") which corresponds to each bit interval regulated by the recording format, the one sync frame has a length 1488 (1488T) times larger than the unit length. Synchronizing information SY is written in the top portion having a length of 14 T in each sync frame so that synchronization can be taken place every sync frame.

The pre-information is written every sync frame in the DVD-R 1. In this recording of pre-information with the pre-pits 4, on the land track 3 contiguous to regions in which the synchronizing information SY in each sync frame of information to be recorded is recorded, a single pre-pit 4 is always formed as one for indicating synchronizing information in the pre-information. Furthermore, on the land track 3 contiguous to a former section in each sync frame other than the synchronizing information SY, one or two pre-pits 4 are formed as ones for indicating the contents of pre-information to be recorded (i.e., address information). However, in the former section in each sync frame other than the synchronizing information SY, the formation of pre-pits 4 depends on the contents of pre-information to be recorded; for example, the pre-pits 4 may not be formed. Additionally, in the first sync frame of one recording sector, three pre-pits 4 are necessarily formed in series in the former section. In this embodiment, as for each recording sector, pre-pits 4 are selectively formed in either one of even-numbered sync frames (hereinafter referred to as "EVEN frames") or odd-numbered sync frames (hereinafter referred to as "ODD frames"), thus pre-information being recorded. For example, as the case shown in FIG. 2, if pre-pits 4 are formed in the EVEN frames (shown by the upward solid arrows in FIG. 2), no pre-pit are formed in the next neighboring ODD frame.

The pre-pits 4 are formed at the positions where the wobbling of the groove track 2 becomes maximum amplitudes.

On one hand, each groove track 2 is wobbled over the entire sync frames at a constant wobbling frequency $f_O$ of 140 kHz (a frequency that one sync frame corresponds to eight waves in the alternating wave form of the groove track 2). In a later-described information recording apparatus, detecting the wobbling frequency $f_O$ enables the detection of a synchronizing signal used for controlling the rotation of a spindle motor that rotates the DVD-R 1.

(II) Second embodiment

A second embodiment of the present invention will be described with reference to FIGS. 3 to 10. The embodiment concerns an information recording apparatus to which the present invention is also applied, and the apparatus is used for recording information to be recorded into the foregoing DVD-R 1.

Figure 3:
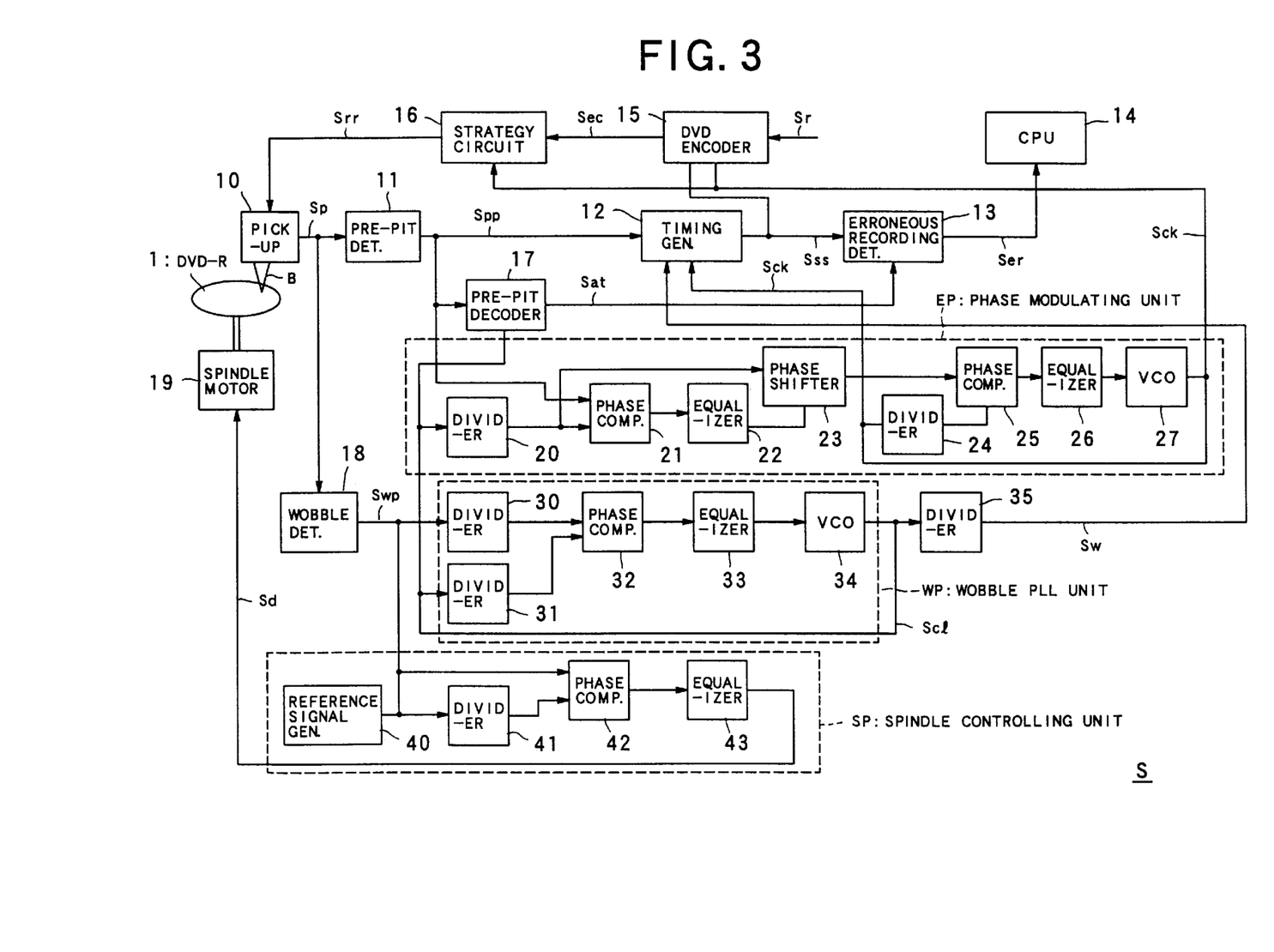
FIG. 3 is a schematic block diagram showing an information recording apparatus according to a second embodiment of the present invention.

Referring to FIG. 3, the entire configuration of the information recording apparatus will be described.

As shown in FIG. 3, the information recording apparatus S of the embodiment has a pickup 10 serving as detecting and recording means, pre-pit detector 11 serving as detecting means, timing generator 12 serving as synchronizing timing signal generating means, erroneous recording detector 13, CPU 14, DVD encoder 15, strategy circuit 16, pre-pit decoder 17 serving as positional timing signal generating means, wobble detector 18, spindle motor 19, divider 35, phase modulating unit EP, wobble PLL(Phase Locked Loop) unit WP, and spindle controlling unit SP.

The phase modulating unit EP comprises dividers 20 and 24, phase comparators 21 and 25, equalizers 22 and 26, a phase shifter 23, and a VCO(Voltage Controlled Oscillator) 27.

The wobble PLL unit WP comprises dividers 30 and 31, a phase comparator 32, an equalizer 33, and a VCO 34.

Still the spindle controlling unit SP is provided with a reference signal generator 40, a divider 41, a phase comparator 42, and an equalizer 43.

The entire operation will now be described.

Data $S_r$ to be recorded, which express information to be recorded written into the DVD-R 1, are provided from the outside to the DVD encoder 15, where the data are 8/16-modulated based on later-described clock signal $S_{ck}$ and sector sync signal $S_{ss}$. The modulated signal $S_{ec}$ is then provided to the strategy circuit 16, where on the basis of a later-described clock signal $S_{ck}$, the modulated signal is wave-converted for adjusting shapes of recording pits formed on the DVD-R 1, and provided to the pickup 10 as a recording signal $S_{rr}$.

The pickup 10 produces a light beam B amplitude-modulated responsively to the recording signal $S_{rr}$, and radiates it on a groove track 2 on which recording pits corresponding to the data $S_r$ to be recorded are formed for recording.

Prior to the formation of the recording pits, the pickup 10 radiates the light beam B onto the DVD-R 1 (refer to FIG. 1), and receives the reflected light of the light beam B, which is modulated by the pre-pits 4 and the wobbled groove track 2. A detection signal $S_p$ is then generated by the modulation, which includes information about the pre-pits 4 and the wobbled groove track 2. The detection signal is then outputted to both the pre-pit detector 11 and the wobble detector 18.

The pre-pit detector 11 selects from the detection signal $S_p$ a pre-pit signal $S_{pp}$ indicating the pre-pits 4 using the radial push-pull method, and outputs the pre-pit signal $S_{pp}$ to the timing generator 12, the pre-pit decoder 17, and a phase comparator 21 of the phase modulating unit EP.

The pre-pit decoder 17 decodes the input pre-pit signal $S_{pp}$ based on a clock signal $S_{cl}$ later described, generates an address signal $S_{at}$ as a positional timing signal showing a region in which a single ECC block is to be recorded.

On one hand, using the input pre-pit signal $S_{pp}$ and based on a wobbling signal $S_w$ and the clock signal $S_{ck}$ both later described, the timing generator 12 generates a sector sync signal $S_{ss}$ which is a synchronizing timing signal showing timing when a region to be recorded with one recording sector is detected, and outputs it to the DVD encoder 15 and the erroneous recording detector 13.

Using the signals thus-received, the erroneous recording detector 13 generates an error-detecting signal $S_{er}$ every timing (interval) at which each ECC block is written, the error-detecting signal being handled as a state signal showing whether or not there is the possibility that data $S_r$ to be recorded included in the ECC block is erroneously recorded. The generated error-detecting signal is provided to the CPU 14. As for the ECC blocks to be written at timing of the detected error-detecting signal $S_{er}$, the CPU 14 determines that there is a higher possibility of erroneous recording if an ECC block is written as it is. In this case, the CPU refrains from the recording in the corresponding region on the DVD-R 1 to the uncertain ECC block. And the CPU controls the DVD encoder 15 and the strategy circuit 16 so as to restart the normal recording from data $S_r$ to be recorded included in the next ECC block to the uncertain ECC block. As a result, the data $S_r$ to be recorded is written normally.

The wobble detector 18, which receives the detection signal $S_p$, generates a wobble detecting signal $S_{wp}$ corresponding to wobbling of the groove track 2 using the detection signal $S_p$. And the wobble detector provides the generated signal $S_{wp}$ for the divider 30 of the wobble PLL unit WP as well as the divider 41 and the phase comparator 42 of the spindle controlling unit SP.

In response to the wobble detecting signal $S_{wp}$ provided, the wobble PLL unit WP generates a clock signal $S_{cl}$ having a frequency which synchronizes with the wobbling frequency of the groove track 2, using the wobble detecting signal $S_{wp}$. The wobble PLL unit then provides the generated clock signal for the divider 35 and the pre-pit decoder 17, and again for the divider 31 for feedback. In the wobble PLL unit WP, a signal produced by dividing the wobble detecting signal $S_{wp}$ by the divider 30 and another signal produced by dividing the clock signal $S_{cl}$ by the divider 31 are mutually compared in phase by the phase comparator 32, and the VCO 34 is driven using a signal resultant from frequency correction of the compared result carried out in the equalizer 33. Accordingly, the clock signal $S_{cl}$ is produced from the VCO.

The divider 35 divides again the clock signal $S_{cl}$ so that a wobbling signal $S_w$ corresponding to the wobbling frequency is produced, the resultant signal being sent to the timing generator 12.

The phase modulating unit EP, which receives both the pre-pit signal $S_{pp}$ and the clock signal $S_{cl}$, based on those signals, generates the foregoing clock signal $S_{ck}$ (of which interval is T described before) which serves as a reference clock in recording data $S_r$ to be recorded, and provides the generated clock signal for the DVD encoder 15 and the strategy circuit 16, also again for the divider 24 for feedback. In the phase modulating unit EP, a signal produced by dividing the clock signal $S_{cl}$ by the divider 20 and the pre-pit signal $S_{pp}$ are mutually compared in phase by the phase comparator 20, and the compared result is corrected in frequency by the equalizer 22. Using the frequency-corrected signal, the divided clock signal $S_{cl}$ by the divider 20 is phase-sifted by the phase sifter 33. The phase-sifted signal then undergoes again phase comparison in the phase comparator 25 with a signal produced by dividing the clock signal $S_{ck}$ by the divider 24. The compared result is then corrected in frequency by the equalizer 26, and using such frequency-corrected signal, the VCO 27 is driven to produce the clock signal $S_{ck}$.

Furthermore, the spindle controlling unit SP, which receives the wobble detecting signal $S_{wp}$, using it, generates a driving signal $S_d$ for driving the spindle motor 19 whose rotation speed is in control, and outputs it to the spindle motor 19. Specifically, in the unit SP, a signal is produced by adding a reference signal outputted from the reference signal generator 40 for the purpose of driving the spindle motor 19 and the wobble detecting signal $S_{wp}$ to each other. The added signal is divided by the divider 41, then the divided result and the wobble detecting signal $S_{wp}$ are mutually phase-compared in the phase comparator 42. The compared result is corrected in frequency characteristics by the equalizer 43 to produce the foregoing driving signal $S_d$. Referring to FIGS. 4A and 4B to 9, the timing generator 12 of the present invention will now be described in terms of its configuration and operation.

First, the configuration of the timing generator 12 will be described using FIG. 4A.

Figure 4A:
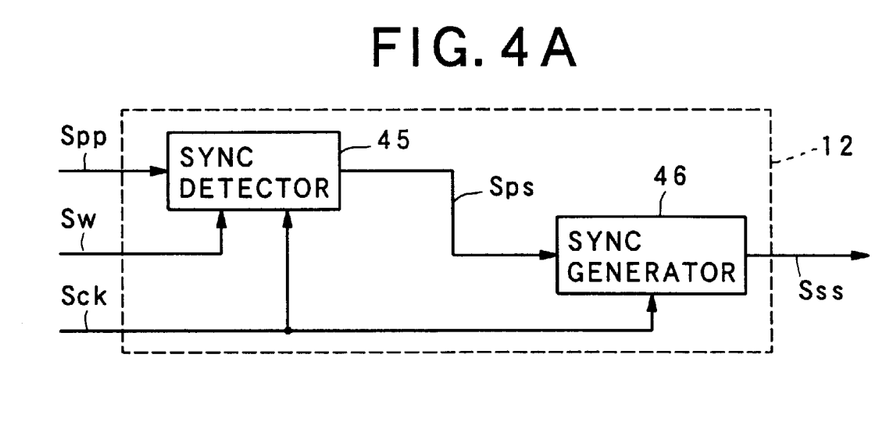
FIG. 4A is a block diagram showing the construction of a timing generator.

As shown in FIG. 4A, the timing generator 12, which receives the pre-pit signal $S_{pp}$, wobbling signal $S_w$, and clock signal $S_{ck}$, has a sync detector 45 and a sync generator 46. Using those signals $S_{pp}$, $S_w$, and $S_{ck}$, the sync detector 45 detects from the pre-pit signal $S_{pp}$ another pre-pit signal $S_{pp}$ which agrees with the synchronizing signal and outputs a detection sync signal $S_{ps}$. Based on the detection sync signal $S_{ps}$ and the clock signal Sck, the sync generator 46 generates the foregoing sector sync signal $S_{ss}$ which is a pulse signal which becomes "HIGH" at times when the detection sync signal $S_{ss}$ is input.

Figure 4B:
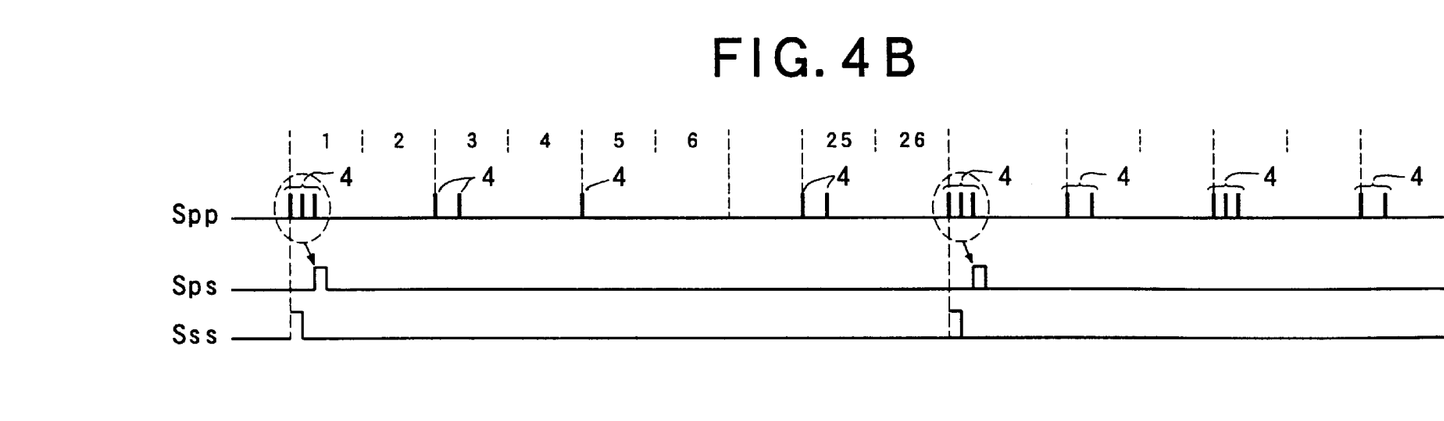
FIG. 4B is a timing chart representing the operation of the timing generator.

Referring to FIG. 4B, description will be given to the entire operation of the timing generator 12.

When the pre-pit signal $S_{pp}$ shown in the uppermost chart in FIG. 4B is input, the sync detector 45 detects the pre-pit signal employed as the synchronizing signal which indicates the top of a single recording sector (in this case, three pre-pits are included in series) in the pre-pit signal $S_{pp}$. In addition, the sync detector 45 generates the detection sync signal $S_p$, as shown in the middle chart in FIG. 4B, which is a pulse signal representing the detection of the pre-pit signal $S_{pp}$ serving as the synchronizing signal.

Responsively to the produced detection sync signal $S_{ps}$, the sync generator 46 generates the sector sync signal $S_{ss}$, as shown in the lowermost chart of FIG. 4B, which becomes "HIGH" exactly at the top of a region into which a single recording sector should be written.

Figure 5:
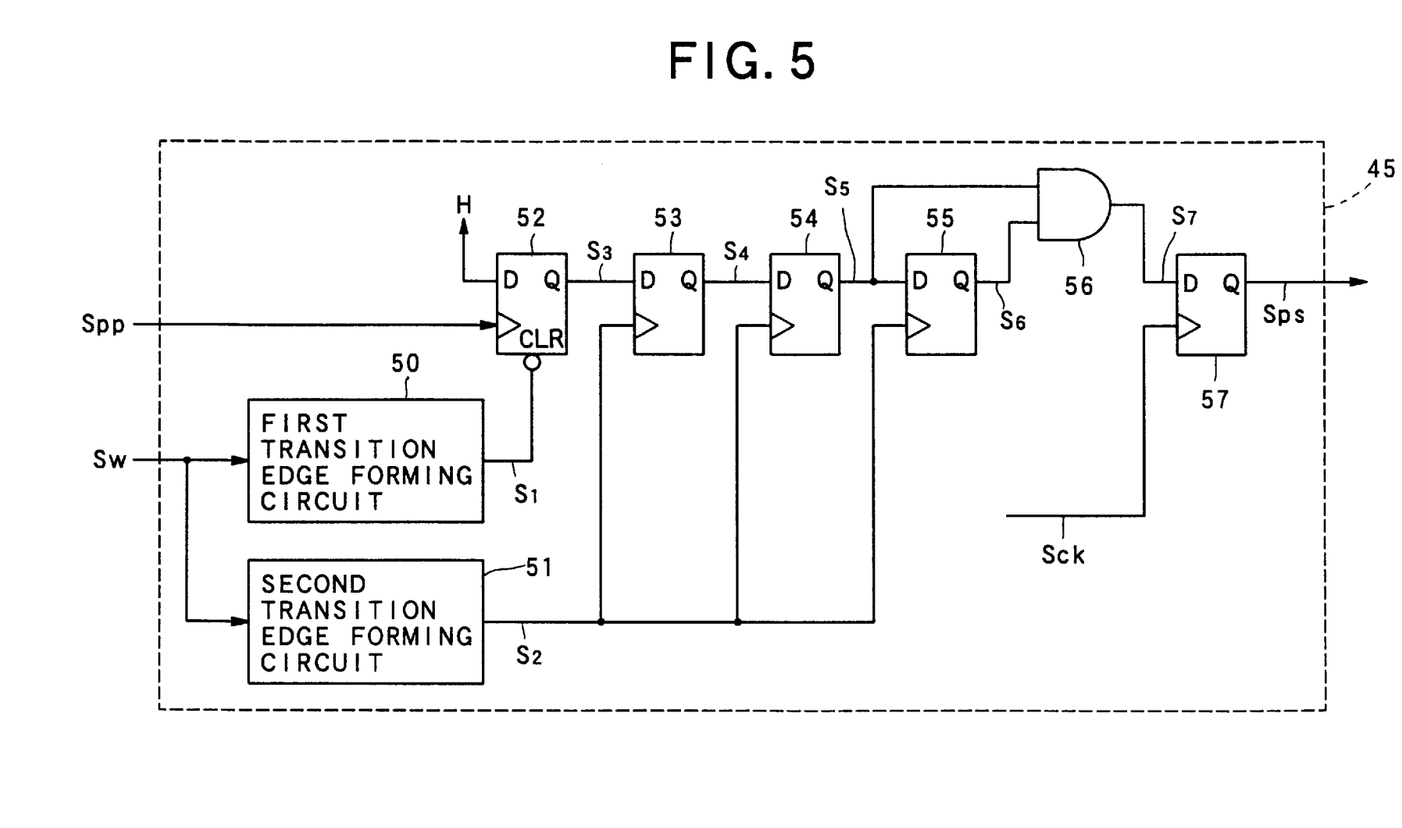
FIG. 5 shows in a block form the configuration of a sync detector.
Figure 6:
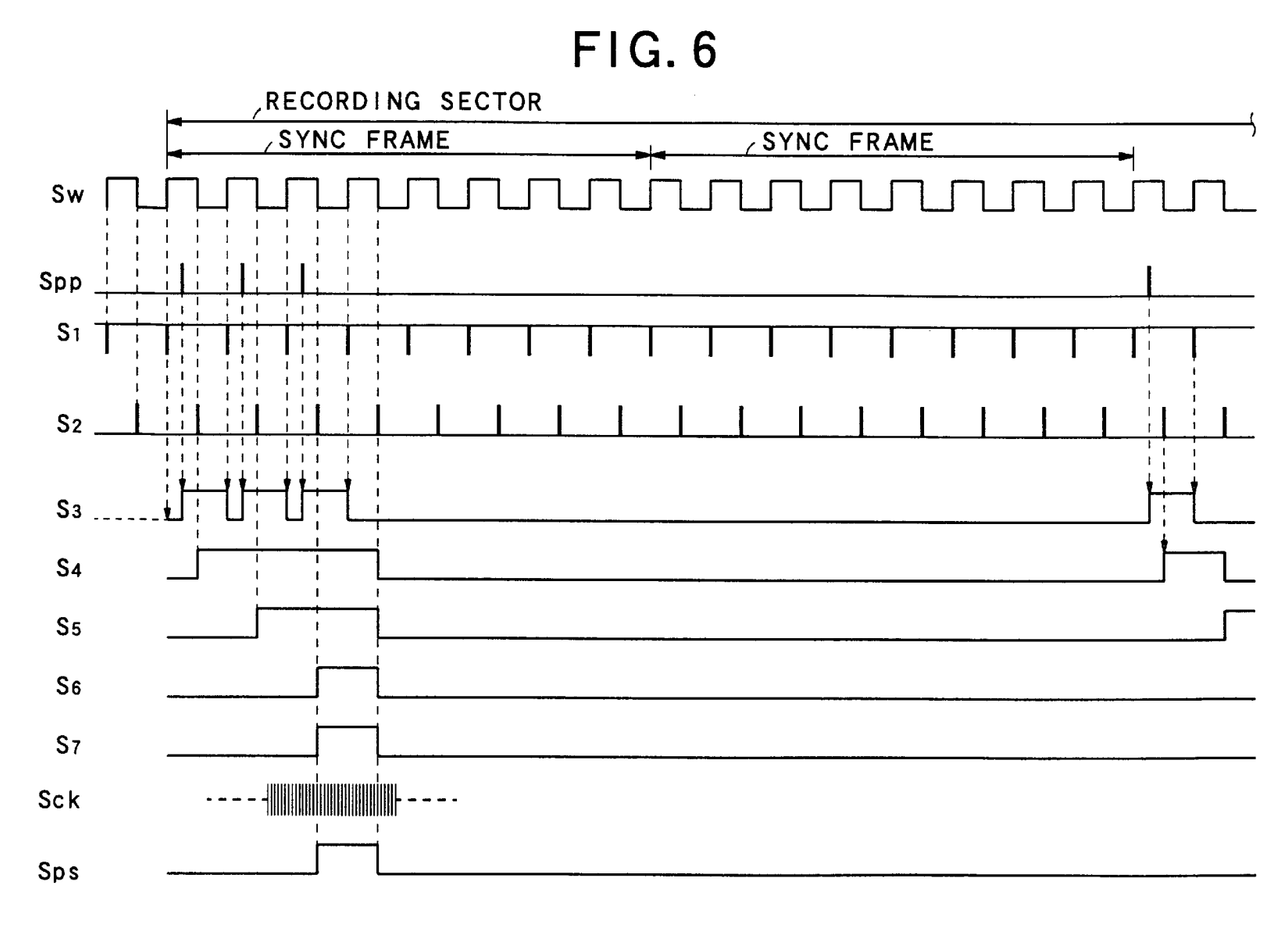
FIG. 6 is a timing chart showing the operation of the sync detector.

Referring to FIGS. 5 and 6, the configuration and operation of the sync detector 45 will be described in detail.

As represented in FIG. 5, the sync detector 45 comprises a first transition edge forming circuit 50, a second transition edge forming circuit 51, D-type flip-flop circuits 52–55 and 57, and an AND circuit 56.

The operation will be explained using FIG. 6. Assume that the sync detector 45 is designed such that pre-pits 4 indicating the top of one recording sector is detected by utilizing the fact that the three pre-pits 4 employed as synchronizing signals corresponding to the initial sync frame of one recording sector are formed in series in agreement with maximum amplitude positions in wobbling of the groove track 2, thereby the detection sync signal $S_{ps}$ being generated.

The wobbling signal $S_w$ inputted into the first transition edge forming circuit 50 undergoes the detection of its first transition timing therein so as to produce a first transition signal $S_1$. The signal $S_1$ is sent to the clear terminal of the flip-flop circuit 52. Concurrently, the wobbling signal $S_w$ inputted into the second transition edge forming circuit 51 is subjected to the detection of its second transition timing so as to produce a second transition signal $S_2$, which is supplied to the clock terminals of the flip-flop circuits 53 to 55.

The flip-flop circuit 52, into which the pre-pit signal $S_{pp}$ is supplied, becomes "HIGH" when this signal activates, and maintains the state of "HIGH" during an interval until the next activation of the second transition signal $S_1$. At last, in the initial interval of the one recording sector, a timing signal $S_3$ including the successive three pulses is produced as shown in FIG. 6.

The flip-flop circuit 53, into which the timing signal $S_3$ is supplied, produces a timing signal $S_4$ maintaining the state of "HIGH" during an interval from a time when the transition from "LOW" to "HIGH" of the second transition signal $S_2$ inputted to the clock terminal and the "HIGH" state of the timing signal $S_3$ are accomplished concurrently to a coming time when the transition from "LOW" to "HIGH" of the second transition signal $S_2$ is solely accomplished.

The flip-flop circuit 54, into which the timing signal $S_4$ is supplied, produces a timing signal $S_5$ maintaining the state of "HIGH" during an interval from a time when the transition from "LOW" to "HIGH" of the second transition signal $S_2$ inputted to the clock terminal and the "HIGH" state of the timing signal $S_4$ are accomplished concurrently to a coming time when the transition from "LOW" to "HIGH" of the second transition signal $S_2$ is solely accomplished (that is, a time when the timing signal $S_4$ transits from "HIGH" to "LOW"). The timing signal $S_5$ is outputted to the flip-flop circuit 55 as well as one input of the AND circuit 56.

The flip-flop circuit 55, into which the timing signal 55 is supplied, produces a timing signal $S_6$ maintaining the state of "HIGH" during an interval from a time when the transition from "LOW" to "HIGH" of the second transition signal $S_2$ inputted to the clock terminal and the "HIGH" state of the timing signal $S_5$ are accomplished concurrently to a coming time when the transition from "LOW" to "HIGH" of the second transition signal $S_2$ is solely accomplished (that is, a time when both the timing signals $S_5$ and $S_4$ transit from "HIGH" to "LOW"). The timing signal $S_6$ is outputted to the other input of the AND circuit 56.

Finally, in the AND circuit 56, both timing signals $S_5$ and $S_6$ are subjected to conjunction (AND) operation to produce a timing signal $S_7$.

In the case of the sync detector 45 having the configuration illustrated in FIG. 5, only when the three successive pre-pits 4 are detected, the final timing signal $S_7$ is produced. That is, the "HIGH" state of the timing signal $S_7$ means that the three pre-pits 4 detected immediately before the "HIGH" state are the start of one recording sector.

In the flip-flop circuit 57, both the timing signal $S_7$ and the clock signal $S_{ck}$ are matched to each other, producing the foregoing detection sync signal $S_{ps}$.

Next, referring to FIGS. 7 to 9, the configuration and operation of the sync generator 46 will be explained in detail.

Figure 7:
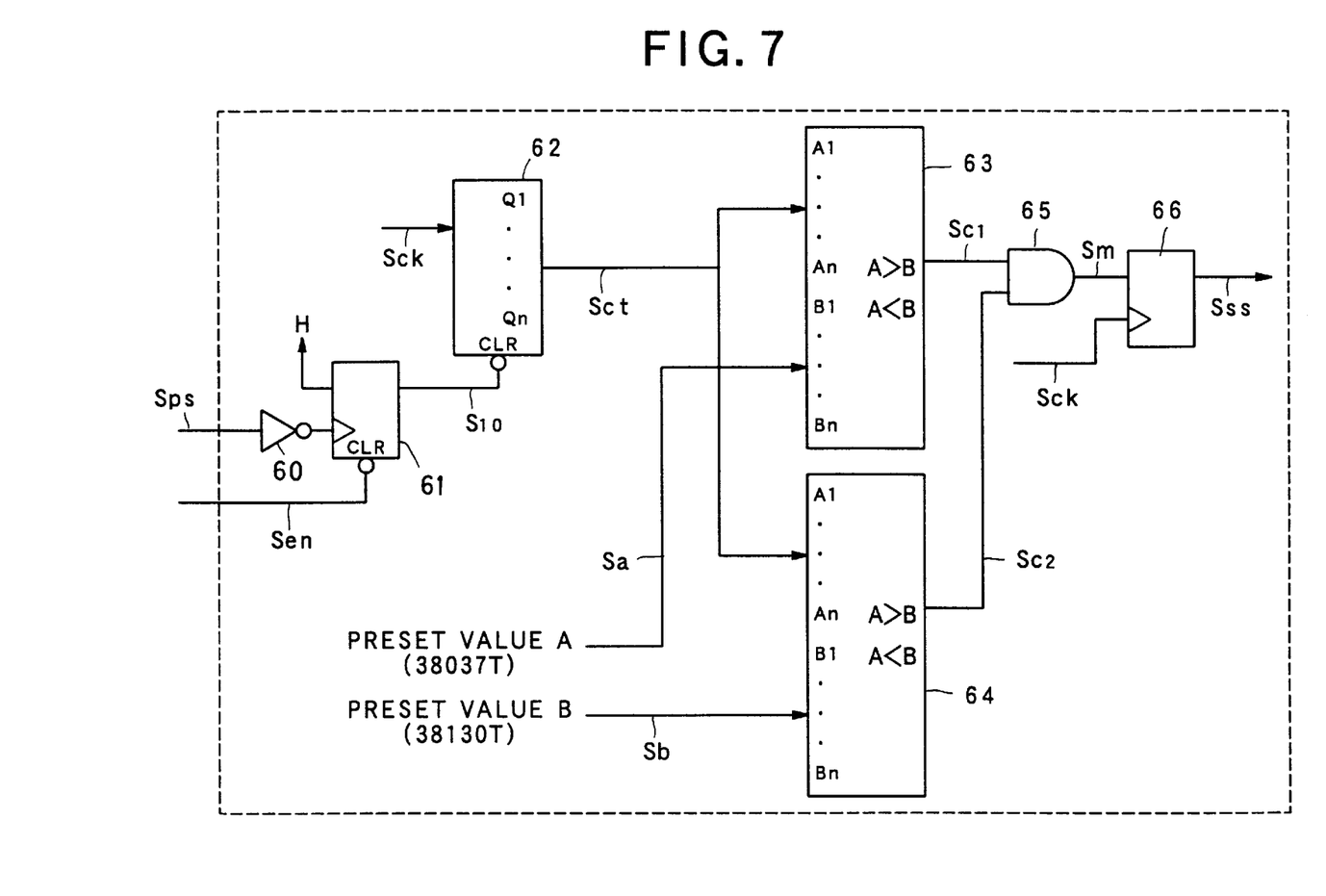
FIG. 7 shows in a block form the configuration of a sync generator.

As shown in FIG. 7, the sync generator 46 comprises an inverter 60, D-type flip-flop circuits 61 and 66, an n-ary counter 62, comparators 63 and 64, and an AND circuit 65.

Figure 8:
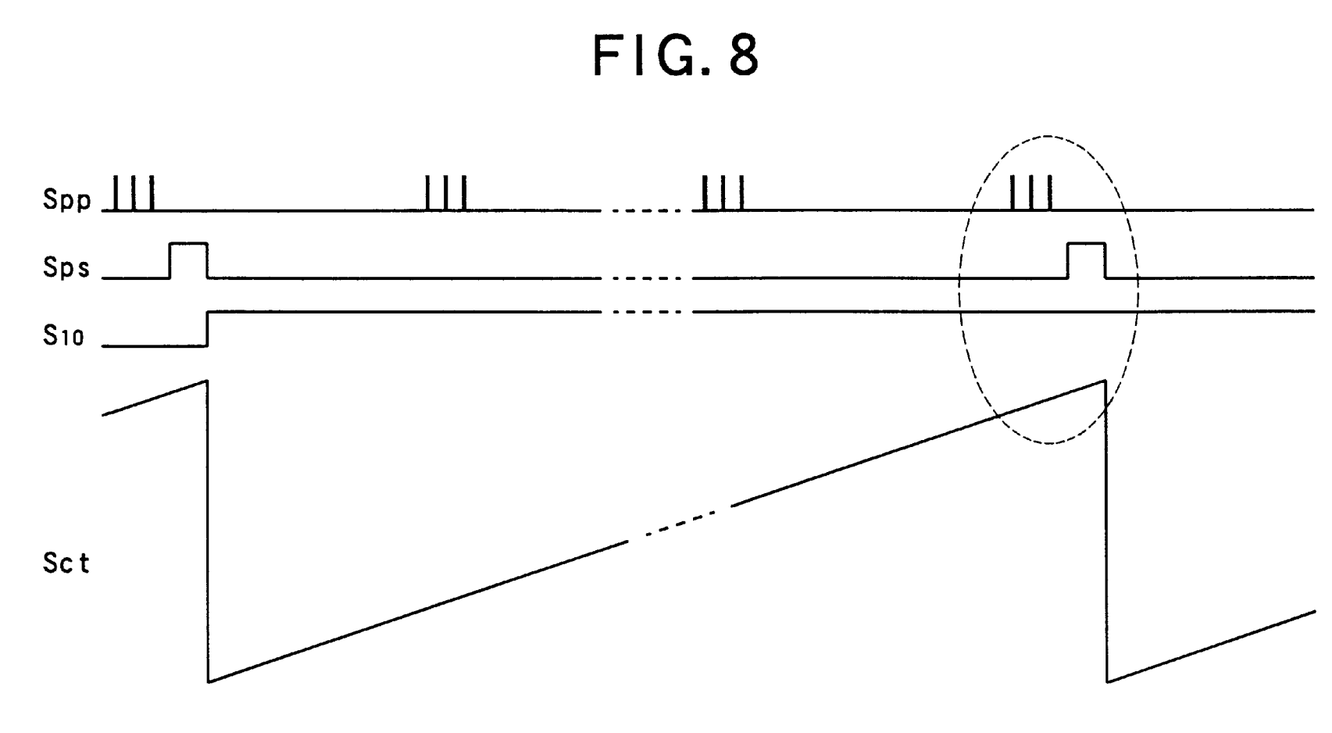
FIG. 8 is one example of a timing chart illustrating the operation of the sync generator.
Figure 9:
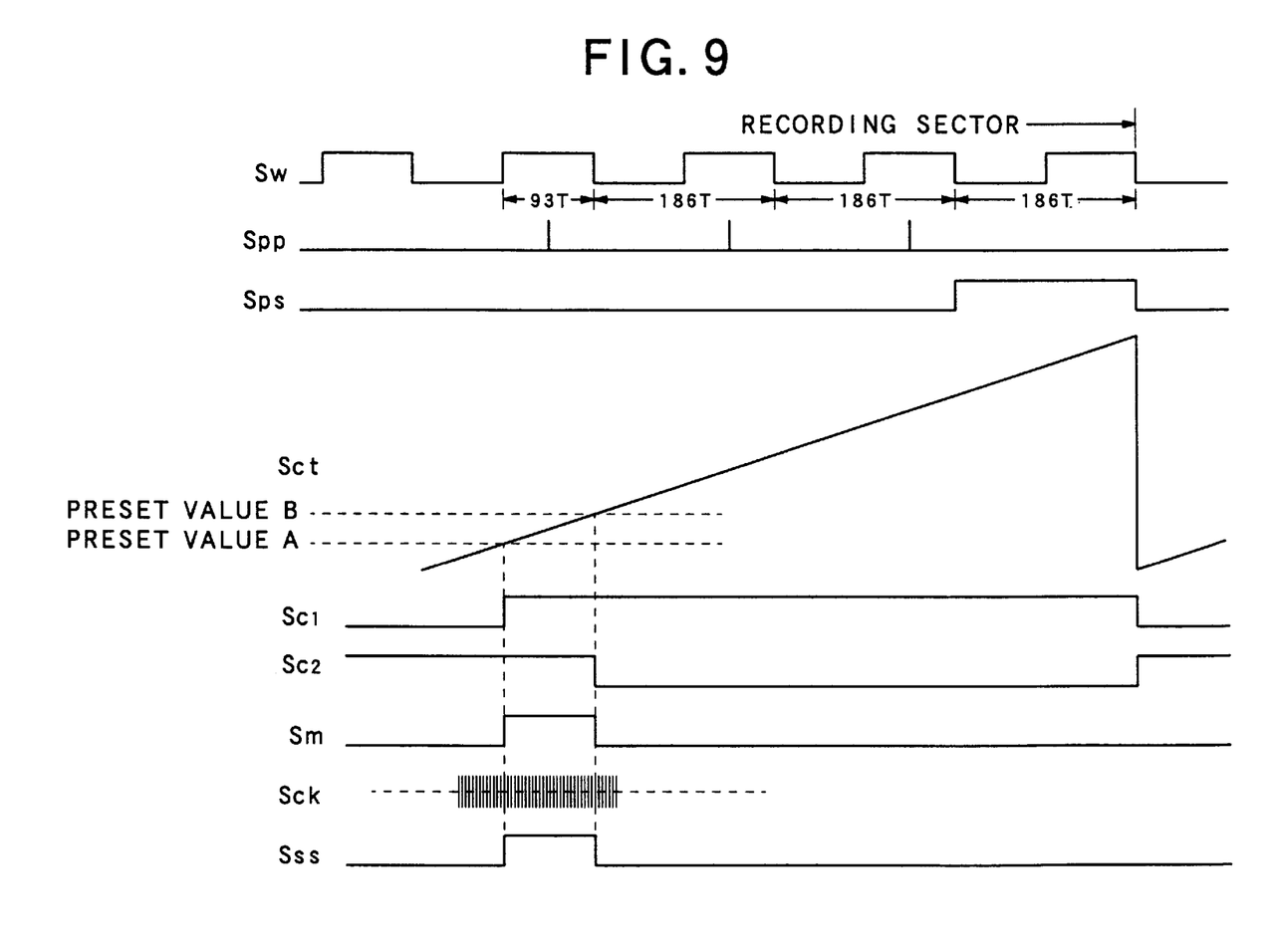
FIG. 9 is another example of a timing chart illustrating the operation of the sync generator.

Using FIGS. 8 and 9, the operation will be stated. A timing chart of FIG. 9 is an enlargement of a portion encircled by a dotted line in FIG. 8 timing chart.

The detection sync signal $S_{ps}$ is inverted by the inverter 60, and inputted to the clock terminal of the flip-flop circuit 61. An enable signal $S_{en}$ is inputted to the clear terminal of the flip-flop circuit 61. The enable signal, which represents a signal settled by various servo control circuits, means allowance of generation of the sector sync signal $S_{ss}$ by the sync generator 46. Accordingly, a timing signal $S_{10}$ is outputted from the flip-flop circuit 61 such that it transits from "LOW" to "HIGH" at a time instant when the detection sync signal $S_{ps}$ changes from "HIGH" to "LOW", as shown in FIG. 8.

The n-ary counter 62 receives the clock signal $S_{ck}$, and counts continuously pulses included in the clock signal $S_{ck}$ during an interval starting from a time instant at which the timing signal $S_{10}$ becomes "HIGH" (i.e., the detection sync signal $S_{ps}$ changes from "HIGH" to "LOW") to a coming time instant when its clearance is done. Thus, as shown in FIG. 8, a counting signal $S_{ct}$ consisting of counts is outputted which changes in a sawtooth waveform.

The comparator 63 receives the counting signal $S_{ct}$, and always compares the counts in the counting signal $S_{ct}$ with a preset-value signal $S_a$ corresponding to a preset value A. If the counts becomes larger than the preset value A, a comparative signal $S_{c1}$ of "HIGH" is generated by the comparator 63 until the next initialization of the counting signal $S_{ct}$ (that is, until the detection sync signal $S_{ps}$ changes from "HIGH" to "LOW"). The comparative signal $S_{c1}$ is provided to one input of the AND circuit 65.

As shown in FIG. 9, the preset value A determines a time at which the pulse of the wobbling signal $S_w$ which corresponds to timing of the first pulse of the three successive pre-pit signals $S_{pp}$ changes into "HIGH". Specifically, the preset value A determines an interval during which 38037T is counted after the counting signal $S_{ct}$ was initialized (i.e., the count is zero). 38037T is a value formed by reducing a value which is 3.5 times larger than the wobbling interval from an interval of one recording sector; namely, 1488T(one sync frame)×26-186T×3-93T

=38037T.

This is because the relation between the detection sync signal $S_{ps}$ and the pre-pits 4 in the top of the recording sector is shown by FIG. 6.

On one hand, the comparator 64 receives the counting signal $S_{ct}$ as well, and always compares the counts in the counting signal $S_{ct}$ with a preset-value signal $S_b$ corresponding to a preset value B. If the counts becomes larger than the preset value B, a comparative signal $S_{c2}$ of "LOW" is generated by the comparator 64 until the next initialization of the counting signal $S_{ct}$. The comparative signal $S_{c2}$ is provided to the other input of the AND circuit 65.

As shown in FIG.9, the preset value B determines a time at which the pulse of the wobbling signal $S_w$ which corresponds to timing of the first pulse of the three successive pre-pit signals $S_{pp}$ changes into "LOW". Specifically, the preset value B determines an interval during which 38130T is counted after the counting signal $S_{ct}$ was initialized. 38130T is a value formed by reducing a value which is 3 times larger than the wobbling interval from an interval of one recording sector; namely, 1488T(one sync frame)×26-186T×3

=38130T.

Like the preset value A, this is because the relation between the detection sync signal $S_{ps}$ and the pre-pits 4 in the top of the recording sector is shown by FIG. 6.

The AND circuit 65 receives both the comparative signals $S_{c1}$ and $S_{c2}$, performs a conjunction operation, and producing an AND signal $S_m$, which is sent to the flip-flop circuit 66.

In the flip-flop circuit 66, the AND signal $S_m$ and clock signal $S_{ck}$ are mutually matched, and the foregoing sector sync signal $S_{ss}$ is produced which shows timing associated with the top of the recording sector.

Additionally, as concerning the sector sync signal $S_{ss}$, a free-run counter or others may be used to continue outputting the signal $S_{ss}$ once it was generated.

Next, referring to FIG. 10, the erroneous recording detector 13 of the present invention will be described in terms of its configuration and operation.

Figure 10A:
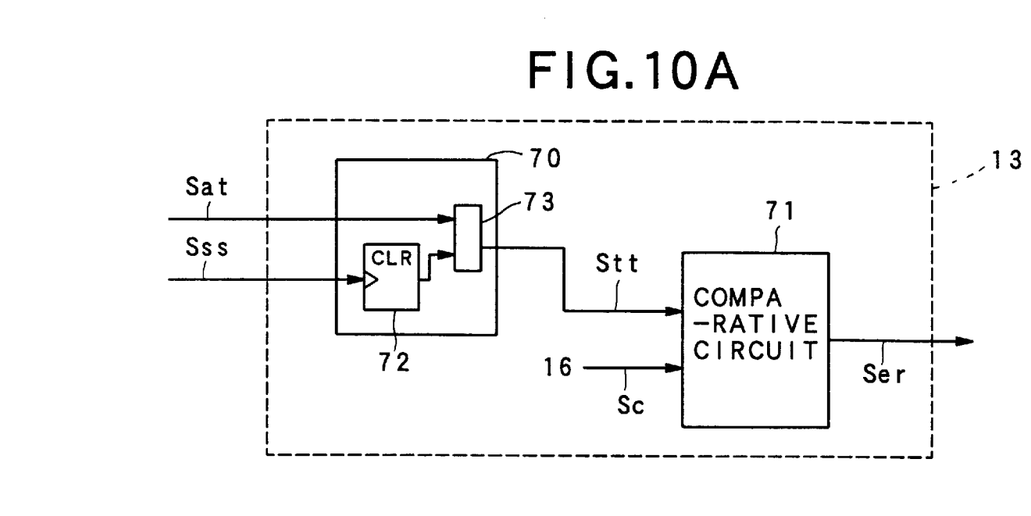
FIG. 10A is a block diagram showing the configuration of an erroneous recording detection unit.
Figure 10B:
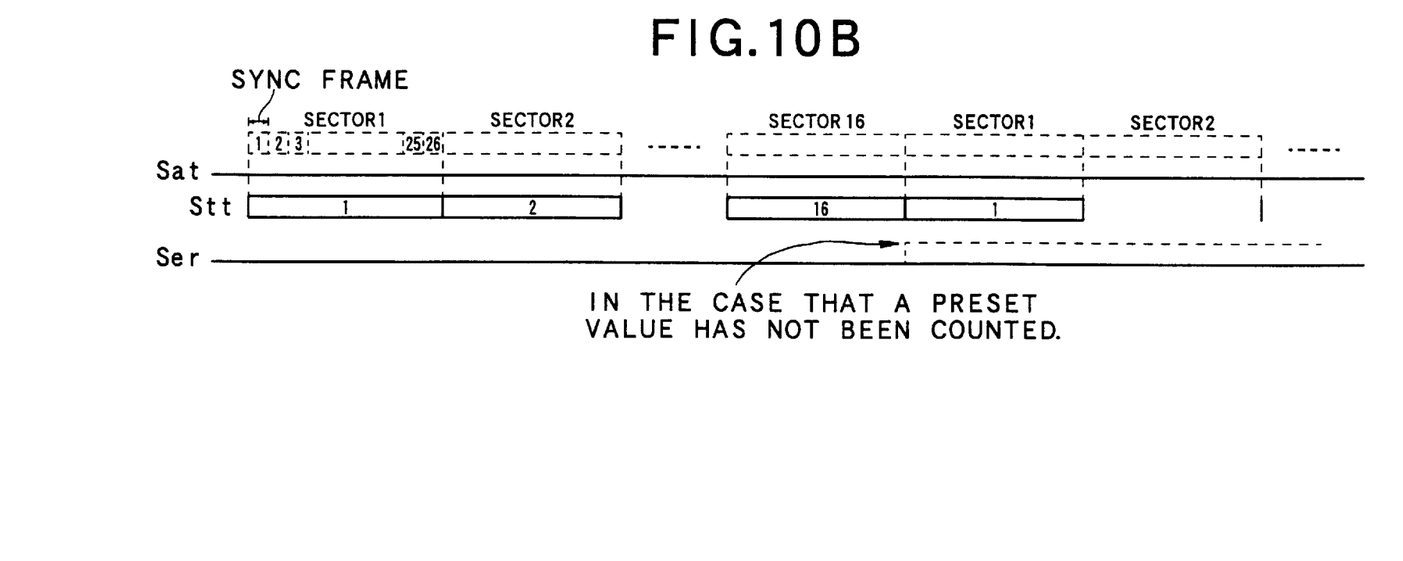
FIG. 10B is a timing chart expressing the operation of the erroneous recording detection unit.

As shown in FIG. 10A, the erroneous recording detector 13 comprises a counting circuit 70 serving as counting means and a comparative circuit 71 serving as state signal producing means. The counting circuit 70 has a counter 72 and a flip-flop circuit 73.

Using FIG. 10B, the operation will be explained.

While the counter 72 is initialized by the pulse signal in the address signal $S_{at}$ (as stated above, the signal becomes "HIGH" at a time when recording of one ECC block starts), it counts the number of pulses in the sector sync signal $S_{ss}$.

Still, while the flip-flop circuit 73 is also initialized by the pule signal in the address signal $S_{at}$, it temporarily memorizes the outputs of the counter 72 and provides the comparative circuit 71 its outputs as a counting signal $S_{tr}$.

The comparative circuit 71 compares the counts of the inputted counting signal $S_{tr}$ and the preset-value signal $S_c$ corresponding to a predetermined number 16 (i.e., a value representing the number of the recording sectors contained in one ECC block). In cases both the numbers are unequal to each other, the comparative circuit 71 outputs the foregoing error- detecting signal $S_{er}$ to the CPU 14. This permits the CPU 14 to recognize uncertain regions among all the regions into which the ECC blocks are to be written. The uncertain regions have a higher possibility of erroneous recording. Where this recognition was done, as to an ECC block which should have been recorded immediately before the time when the error-detecting signal $S_{er}$ was produced, the ECC block is not recorded in the uncertain region on the DVD-R 1 which was originally assigned to the ECC block. In such case, data $S_r$ to be recorded included in the next ECC block to the ECC block having a possibility that erroneous recording may occur therein are subjected to the restart of their normal recording.

According to the information recording apparatus S, using the number of pulses of the sector sync signal $S_{ss}$ detected, the possibility of erroneous recording is deduced from the two successive address signals $S_{at}$ corresponding to a region into which one ECC block is written. Thus a possibility of erroneous recording can be acquired accurately.

When the number of pulses in the sector sync signal Sss and the number "16" of recording sectors which should be included in one ECC block differs from each other, it is recognizable that there is a possibility of erroneous recording within a region into which the one ECC block is written. In consequence, only a simple comparison between them leads to examination whether or not there is such possibility, every ECC block unit. This method can simplify processing of erroneous recording detection.

Further, since erroneous recording is sensed in advance and data to be recorded are corrected, information recording can be carried out accurately.

Various alternative examples can be applied to the foregoing embodiments. Although the foregoing embodiment is configured such that the number of recording sectors written in a region corresponding to one ECC block is counted to be compared to a preset value at "16", the present invention is not confined to such configuration. An alternative is given such that the number of sync frames written in a region corresponding to one ECC block is counted, compared with the number "416(=26×16)" which should be included in the one ECC block, and recognized as erroneous recording where both the numbers differ from each other.

Still, another alternative example is provided, in which the amount(the number of bytes) of data $S_r$ to be recorded written in a region corresponding to one ECC block is detected, compared with an amount of data which should be included in the one ECC block, and recognized as erroneous recording where both the amounts differ from each other.

Still further, another alternative example is provided, in which the repetition of recording sectors (or the repetition or the amount of information of sync frames) written in a region corresponding to one ECC block is integrated in analog quantities, compared with the number of recording sectors (or the number or amounts of information of sync frames) which should be included in the one ECC block, and recognized as erroneous recording where both the values differ from each other.

Still, in the foregoing embodiment, the number of recording sectors are counted, and compared with a preset-value "16" in order to determine from the compared result only whether or not there is a possibility of erroneous recording. Alternatively, it may be provided that differences between the counts and the preset-value "16" is obtained as numerical values, and compared with a predetermined threshold (for example, 16±3 or others). Provided that the difference is within the allowance range of the threshold, the recording is allowed, while the difference is beyond the threshold, the recording of data $S_r$ to be recorded to the corresponding ECC block is not performed.

Numerous other modifications and variations of the present invention will be apparent to those skilled in the art in view of the foregoing description. Thus, it is to be understood that, within the scope of the appended claims, the present invention may be practiced other than as specifically described hereinabove.

What is claimed is:

1. A method of detecting an occurrence of erroneous recording in recording information to be recorded into a recording medium, wherein the information to be recorded consists of a plurality of information blocks each including a predetermined number of information units each including a predetermined amount of partial information to be recorded; synchronizing information is previously recorded in the recording medium every region into which the partial information is recorded; and positional information is previously recorded in the recording medium every region into which the information to be recorded constituting each information block is recorded, the method comprising the steps of;
   detecting both the synchronizing information and the positional information from the recording medium;
   first producing, using the detected synchronizing information, a synchronizing timing signal showing a time at which the synchronizing information is detected;
   second producing, using the detected positional information, a positional timing signal showing a time at which each information block is assigned to be recorded;
   counting the synchronizing timing signal in number produced during an interval defined by the successive two positional timing signals; and
   third producing a state signal for estimating the occurrence of the erroneous recording on the basis of the counted number of the synchronizing timing signal and the predetermined number of the information unit.

2. The method of claim 1, wherein the recording medium is a DVD-R, the information block is an ECC block of the DVD-R, and the information unit is a recording sector of the ECC block.

3. The method of claim 1, wherein the state signal is a signal for estimating whether or not there is a possibility of the erroneous recording, and
   the state signal produced in the third producing step shows there is a possibility of the erroneous recording in the region into which the one information block is recorded, provided the number of the counted synchronizing timing signal and the predetermined number differs from each other.

4. The method of claim 3, wherein the recording medium is a DVD-R, the information block is an ECC block of the DVD-R, and the information unit is a recording sector of the ECC block.

5. A method of recording information to be recorded in a recording medium, wherein the information to be recorded consists of a plurality of information blocks each including a predetermined number of information units each including a predetermined amount of partial information to be recorded; synchronizing information is previously recorded in the recording medium every region into which the partial information is recorded; and positional information is previously recorded in the recording medium every region into which the information to be recorded constituting each information block is recorded, the method comprising the steps of;
   detecting both the synchronizing information and the positional information from the recording medium;
   first producing, using the detected synchronizing information, a synchronizing timing signal showing a time at which the synchronizing information is detected;
   second producing, using the detected positional information, a positional timing signal showing a time at which each information block is assigned to be recorded;
   counting the synchronizing timing signal in number produced during an interval defined by the successive two positional timing signals;
   third producing a state signal for estimating an occurrence of erroneous recording on the basis of the counted number of the synchronizing timing signal and the predetermined number of the information unit; and
   recording the information to be recorded into the recording medium with correction of the information to be recorded on the basis of the state signal.

6. The method of claim 4, wherein the recording medium is a DVD-R, the information block is an ECC block of the DVD-R, and the information unit is a recording sector of the ECC block.

7. An apparatus for detecting an occurrence of erroneous recording in recording information to be recorded into a recording medium, wherein the information to be recorded consists of a plurality of information blocks each including a predetermined number of information units each including a predetermined amount of partial information to be recorded; synchronizing information is previously recorded in the recording medium every region into which the partial information is recorded; and positional information is previously recorded in the recording medium every region into which the information to be recorded constituting each information block is recorded, the apparatus comprising;
   means for detecting both the synchronizing information and the positional information from the recording medium;
   first means for producing, using the detected synchronizing information, a synchronizing timing signal showing a time at which the synchronizing information is detected;

second means for producing, using the detected positional information, a positional timing signal showing a time at which each information block is assigned to be recorded;

means for counting the synchronizing timing signal in number produced during an interval defined by the successive two positional timing signals; and third means for producing a state signal for estimating the occurrence of the erroneous recording on the basis of the counted number of the synchronizing timing signal and the predetermined number of the information unit.

8. The apparatus of claim 7, wherein the recording medium is a DVD-R, the information block is an ECC block of the DVD-R, and the information unit is a recording sector of the ECC block.

9. The apparatus of claim 7, wherein the state signal is a signal for estimating whether or not there is a possibility of the erroneous recording, and the state signal produced by the third producing means shows there is a possibility of the erroneous recording in the region into which the one information block is recorded, provided the number of the counted synchronizing timing signal and the predetermined number differs from each other.

10. The apparatus of claim 9, wherein the recording medium is a DVD-R, the information block is an ECC block of the DVD-R, and the information unit is a recording sector of the ECC block.

11. An apparatus for recording information to be recorded in a recording medium, wherein the information to be recorded consists of a plurality of information blocks each including a predetermined number of information units each including a predetermined amount of partial information to be recorded; synchronizing information is previously recorded in the recording medium every region into which the partial information is recorded; and positional information is previously recorded in the recording medium every region into which the information to be recorded constituting each information block is recorded, the apparatus comprising;

means for detecting both the synchronizing information and the positional information from the recording medium;

first means for producing, using the detected synchronizing information, a synchronizing timing signal showing a time at which the synchronizing information is detected;

second means for producing, using the detected positional information, a positional timing signal showing a time at which each information block is assigned to be recorded;

means for counting the synchronizing timing signal in number produced during an interval defined by the successive two positional timing signals;

third means for producing a state signal for estimating an occurrence of erroneous recording on the basis of the counted number of the synchronizing timing signal and the predetermined number of the information unit; and means for recording the information to be recorded into the recording medium with correction of the information to be recorded on the basis of the state signal.

12. The apparatus of claim 10, wherein the recording medium is a DVD-R, the information block is an ECC block of the DVD-R, and the information unit is a recording sector of the ECC block.

* * * * *